US 8,275,656 B2

(12) United States Patent
Cetin

(10) Patent No.: US 8,275,656 B2
(45) Date of Patent: Sep. 25, 2012

(54) MAXIMUM LIKELIHOOD ESTIMATION UNDER A COVARIANCE CONSTRAINT FOR PREDICTIVE MODELING

(75) Inventor: Ozgur Cetin, New York, NY (US)

(73) Assignee: Yahoo! Inc., Sunnyvale, CA (US)

( * ) Notice: Subject to any disclaimer, the term of this patent is extended or adjusted under 35 U.S.C. 154(b) by 291 days.

(21) Appl. No.: 12/722,524

(22) Filed: Mar. 11, 2010

(65) Prior Publication Data

US 2011/0225042 A1   Sep. 15, 2011

(51) Int. Cl.
 *G06Q 30/00* (2012.01)
(52) U.S. Cl. ..................................................... 705/14.1
(58) Field of Classification Search .................. 705/14.1
See application file for complete search history.

(56) References Cited

U.S. PATENT DOCUMENTS

2009/0177645 A1* 7/2009 Heck ................................. 707/5

OTHER PUBLICATIONS

Cetin, O. "Maximum likelihood Gaussian estimation under a covariance floor constraint," Statistics & Probability Letters, Jan. 5, 2010, 12 pages.

"Clickthrough rate," Wikipedia, the free encyclopedia, last modified Apr. 3, 2012 http://en.wikipedia.org/wiki/Click-through_rate.
"Expectation-maximization algorithm," Wikipedia, the free encyclopedia, last modified May 23, 2012 http://en.wikipedia.org/wiki/Expectation-maximization_algorithm.

* cited by examiner

*Primary Examiner* — Daniel Lastra
(74) *Attorney, Agent, or Firm* — Frommer Lawrence & Haug LLP; John W. Branch

(57) ABSTRACT

Embodiments employ a maximum likelihood estimation (MLE) under a covariance matrix floor constraint to predict missing data from observed data. An MLE solution is obtained for approximately Gaussian distributions under the constraint that the covariance matrix is greater than or equal to a positive-definite matrix. In one embodiment, an offline model estimation is performed using an expectation-maximization (EM) approach to estimate various statistical parameters based on observed data. Then, in an online approach, parameters for various missing CTR data may be predicted based on the offline estimated statistical parameters. A non-limiting, non-exhaustive example using the constrained MLE approach is described for predicting missing click-through rate data useable in selecting an advertisement to display with a search query result.

14 Claims, 4 Drawing Sheets

MAXIMUM LIKELIHOOD ESTIMATION UNDER A COVARIANCE CONSTRAINT FOR PREDICTIVE MODELING

TECHNICAL FIELD

Embodiments relate generally to a prediction of missing data from observed data and, more particularly, but not exclusively to, expanding or enriching features about an advertisement to improve matching of the advertisement to content within a web page, a sponsored search query, or similar activities based on predicting missing data about an advertisement from observed data for related advertisements.

BACKGROUND

Tremendous changes have been occurring in the Internet that influence our everyday lives. For example, in today's society, one of the first activities that a user might perform during their day is to turn on their computers to communicate with friends, co-workers, family, as well as to read news, and/or search for various information. In fact, today, many of a person's social activities are now being conducted over the Internet.

Thus, many people are looking to the Internet to provide them with richer, fuller content that might include live tutorials, movies, music, and yes, even richer advertisements. Many people today have identified advertisements to not only be entertaining, but educational and informative. However, when an advertisement is displayed along with content in an unrelated manner, such advertisements might actually turn out to be distracting to the user. Further, such unrelated advertisements might not be selected or clicked on by a user, providing little or no revenue to the advertiser.

One such location for displaying advertisements is typically within a web page that is displayed as a result of a user search query. Various commercial web search engines often show results to a search query along with advertisements that have been selected based in part on the various ranking schemes. One such criteria for selecting which advertisements are to be displayed has been based on a historical Click-Through Rate or CTR. Briefly, a CTR is a way of measuring a success of an online advertisement based on historical data for a given advertisement. CTR is often defined as a "number of clicks" divided by a "number of times the advertisement was delivered" (impressions) for viewing. Because this definition fails to account for a particular person clicking on the same advertisement multiple times, another definition for CTR is sometimes used, where CTR is defined as the "number of persons" who clicked a particular advertisement divided by the "number of impressions." In either instance, use of CTR remains a common mechanism for selecting advertisements for display.

However, where an advertisement is new, such historical CTR data might not be available. Similarly, there might also not be CTR data available for all possible search query request—advertisement combinations. Thus, for a variety of reasons, historical CTR data might be unavailable, and/or otherwise incomplete for a given search query request—advertisement combination. Thus, it is with respect to these considerations and others that the present invention has been made.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding, reference will be made to the following Detailed Description, which is to be read in association with the accompanying drawings, wherein.

DETAILED DESCRIPTION

Figure 1:
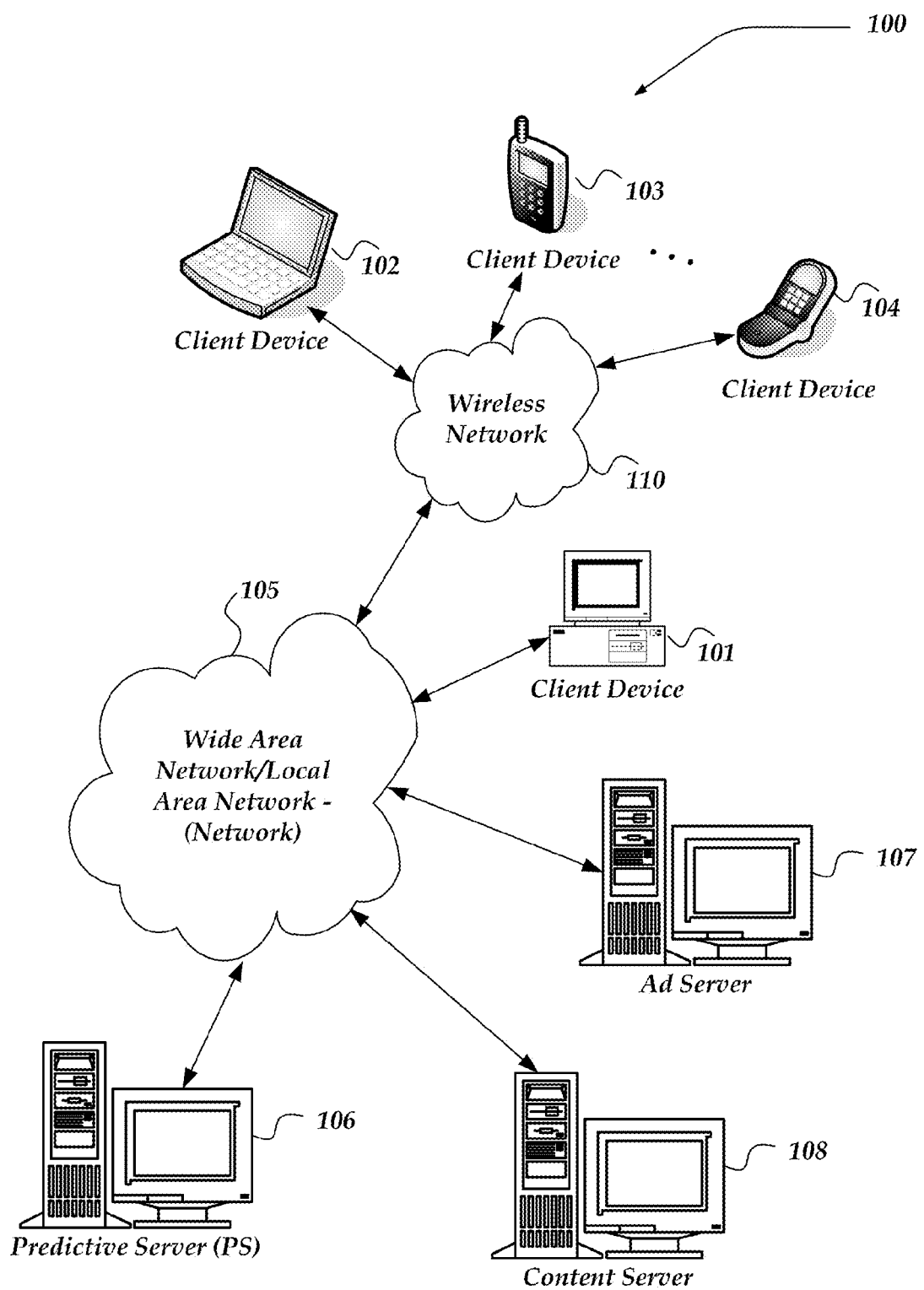
FIG. 1 is a system diagram of one embodiment of an environment in which various embodiments may be practiced.

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, embodiments are directed towards employing a maximum likelihood estimation (MLE) under a covariance matrix floor constraint for predicting missing data based on observed data. A maximum likelihood solution is obtained for approximately Gaussian distributions under the constraint that the covariance matrix is greater than or equal to a given positive-definite matrix. In one embodiment, an offline model estimation is performed using an expectation-maximization (EM) approach to estimate various statistical parameters based on observed data. Then, in an online approach, parameters for various missing data may be predicted based on the offline estimated parameters.

A non-limiting, non-exhaustive application of the constrained MLE approach is described below for predicting missing CTR data for use in selecting an advertisement for display with a search query result. As discussed above, internet search engines often operate by displaying advertisements alongside of search query results. While historical CTR data is often a good indicator of the "clickability," or likelihood that an advertisement will be clicked on when displayed to a user, such CTR data may be missing for new advertisements, campaigns, advertisers, query-advertisement combinations, or the like. Moreover, such CTR data may be noisy due to accidental clicking by users, spam activities, and even due to activities by robots. Therefore, the constrained MLE approach may be used in conjunction with a mixture of approximately Gaussian distributions of observed CTR data for modeling CTRs extracted from several levels of a query-advertisement hierarchy. Results may then be used to predict any missing values in the hierarchy. The mixture is directed towards providing flexibility in fitting increasingly complex data models, while the lower-bound constraint is directed towards providing robustness against inherent noise due to spam, robots, accidental clicks, or the like.

While the disclosure below employs the derived maximum likelihood estimation (MLE) under the covariance floor constraint for selecting advertisements, the disclosed constrained MLE approach may also be employed for a variety of other applications. For example, the constrained MLE approach may also be used for acoustic modeling, e.g., for statistical speech recognition, as is further discussed below. Thus, the embodiments are not limited to predicting missing CTR data, and the disclosed MLE approach may also be used for a variety of other applications.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")-(network) 105, wireless network 110, client devices 101-104, Predictive Server (PS) 106, Ad server 107, and content server 108.

One embodiment of a client device usable as one of client devices 101-104 is described in more detail below in conjunction with FIG. 2. Generally, however, client devices 102-104 may include virtually any mobile computing device capable of receiving and sending a message over a network, such as wireless network 110, or the like. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, or the like. Client device 101 may include virtually any computing device that typically connects using a wired communications medium such as personal computers, multiprocessor systems, microprocessor-based or programmable consumer electronics, network PCs, or the like. In one embodiment, one or more of client devices 101-104 may also be configured to operate over a wired and/or a wireless network.

Client devices 101-104 typically range widely in terms of capabilities and features. For example, a cell phone may have a numeric keypad and a few lines of monochrome LCD display on which only text may be displayed. In another example, a web-enabled client device may have a touch sensitive screen, a stylus, and several lines of color LCD display in which both text and graphics may be displayed.

A web-enabled client device may include a browser application that is configured to receive and to send web pages, web-based messages, or the like. The browser application may be configured to receive and display graphics, text, multimedia, or the like, employing virtually any web-based language, including a wireless application protocol messages (WAP), or the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), or the like, to display and send information.

Client devices 101-104 also may include at least one other client application that is configured to receive content from another computing device. The client application may include a capability to provide and receive textual content, multimedia information, or the like. The client application may further provide information that identifies itself, including a type, capability, name, or the like. In one embodiment, client devices 101-104 may uniquely identify themselves through any of a variety of mechanisms, including a phone number, Mobile Identification Number (MIN), an electronic serial number (ESN), mobile device identifier, network address, or other identifier. The identifier may be provided in a message, or the like, sent to another computing device.

Client devices 101-104 may also be configured to communicate a message, such as through email, SMS, MMS, IM, IRC, mIRC, Jabber, or the like, between another computing device. However, the present invention is not limited to these message protocols, and virtually any other message protocol may be employed.

Client devices 101-104 may further be configured to include a client application that enables the user to log into a user account that may be managed by another computing device, such as content server 108, PS 106, or the like. Such user account, for example, may be configured to enable the user to receive emails, send/receive IM messages, SMS messages, access selected web pages, or participates in any of a variety of other social networking activity. However, managing of messages or otherwise participating in other social activities may also be performed without logging into the user account. In one embodiment, the user of client devices 101-104 may also be enabled to access a web page, perform a search query for various content, or other perform any of a variety of other activities. However, in another embodiment, a user might further employ client devices 101-104 in conjunction with an audio application that enables automatic speech recognition. For example, client devices 101-104 might employ various hardware components such as speakers, microphones, or the like, in which to input an audio signal, and/or receive an audio output signal. In one embodiment, client devices 101-104 might employ various hardware components for which the audio application might have incomplete information about, such as might arise when a new microphone or speaker is attached to the client device, or where the audio input and/or output signal is determined by the audio application to include noise, or the like.

Wireless network 110 is configured to couple client devices 102-104 with network 105. Wireless network 110 may include any of a variety of wireless sub-networks that may further overlay stand-alone ad-hoc networks, or the like, to provide an infrastructure-oriented connection for client devices 102-104. Such sub-networks may include mesh networks, Wireless LAN (WLAN) networks, cellular networks, or the like.

Wireless network 110 may further include an autonomous system of terminals, gateways, routers, or the like connected by wireless radio links, or the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G), 4th (4G) generation radio access for cellular systems, WLAN, Wireless Router (WR) mesh, or the like. Access technologies such as 2G, 2.5G, 3G, 4G, and future access networks may enable wide area coverage for client devices, such as client devices 102-104 with various degrees of mobility. For example, wireless network 110 may enable a radio connection through a radio network access such as Global System for Mobile communication (GSM), General Packet Radio Services (GPRS), Enhanced Data GSM Environment (EDGE), Wideband Code Division Multiple Access (WCDMA), Bluetooth, or the like. In essence, wireless network 110 may include virtually any wireless communication mechanism by which information may travel between client devices 102-104 and another computing device, network, or the like.

Network 105 is configured to couple PS 106, content server 108, ad server 107, and client device 101 with other computing devices, including through wireless network 110 to client devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between computing devices.

Ad server 107 includes one or more network devices that are configured to provide advertisements that may be displayed to a client device, such as client devices 101-104. In one embodiment, an advertisement may include a variety of different digital data, including, but not limited to motion pictures, movies, videos, music, audio files, text, graphics, and/or any of a combination of digital data formats. In one embodiment, Ad server 107 may store the advertisements within a computer-readable storage device residing within or accessible by Ad server 107. Moreover, Ad server 107 may store within a computer-readable storage device CTR data for advertisements, and/or query-advertisement combinations. Such historical CTR data may be obtained from one or more search engines based on various query results provided to a client device.

In one embodiment, an advertisement may be provided to PS 106, and/or content server 108, for possible inclusion with content to a client device. In one embodiment, an advertisement might be provided for display alongside of, or otherwise, with a display of a search query result. In one embodiment, the advertisement might be selected for display with the search query result based on an analysis of available and/or predicted CTR data for various combinations of query-advertisement data.

Content server 108 represents one or more network devices that are configured to provide content to client devices 101-104. In one embodiment, the content may be provided to a client device based on a request for the content. However, in another embodiment, content server 108 may also provide content to a client device based on a push mechanism, wherein the content might not be requested content. Such content might include any of a variety of content that might be provided to a client device over a network, including web pages, search query results, download requests, or the like. For example, such content might also take the form of a message, such as an email message, an instant message, or the like.

One embodiment of PS 106 is described in more detail below in conjunction with FIG. 3. Briefly, however, PS 106 is configured to employ a maximum likelihood estimation (MLE) under a covariance matrix floor constraint to predict missing data from observed data. A maximum likelihood solution is obtained for approximately Gaussian distributions under the constraint that the covariance matrix is greater than or equal to a positive-definite matrix. In one embodiment, an offline model estimation is performed using an expectation-maximization (EM) approach to estimate various statistical parameters based on observed data. Then, in an online approach, parameters for various missing CTR data may be predicted based on the offline estimated parameters. In one embodiment, PS 106 may employ the constrained MLE to predict missing click-through rates to select an advertisement for display with a result of search query. Thus, in one embodiment, PS 106 might receive at least some historical CTR data from Ad server 107 for various advertisements and/or query-advertisement combinations. PS 106 may then employ the provided CTR data to generate a vector of CTR data that may include missing element data for various other query-advertisement combinations.

For example, in one embodiment, a vector might be generated in a hierarchical manner. Consider a brand new advertisement from Newstate, an insurance company. The new advertisement is for auto insurance. When a user enters a query for say insurance for a VW vehicle, a search engine that might reside within content server 108, PS, 106, or the like, will likely not have historical CTR data for that particular query-advertisement combination. However, in one non-limiting, embodiment, PS 106 may extract various CTR data of related events in a hierarchical manner, such as:

1. Query category (insurance)
2. Query (insurance coverage for VW)
3. Advertiser (Newstate)
4. Advertisement (new Newstate advertisement)
5. Query-advertisement combination (new Newstate advertisement for insurance coverage for VW)

In this non-limiting example, it is likely that PS 106 may obtain CTR data at levels 1 and 3 (above) and determine that it is missing CTR data for levels 2, 4, and 5. Thus, in one embodiment, PS 106 employs the observed CTR data for levels 1 and 3 to predict the missing CTR data for levels 2, 4, and 5.

PS 106 may perform such actions, using at least a two-stage approach, which is described in more detail below in conjunction with FIG. 4. Briefly, however, PS 106 may, perform a first stage, in an offline approach. That is, PS 106 might perform the first stage prior to receiving a search query request from one of client devices 101-104, or otherwise, in a non-real time configuration. In the first stage, PS 106 may estimate various statistical parameters about the query-advertisement vector components. Then, in an online approach, the estimated statistical parameters may be used to predict missing CTR data for levels 2, 4, and 5 above from the observed ones (levels 1 and 3). PS 106 may then employ the predicted statistical parameters to select an advertisement for a received search query. In one embodiment, PS 106 may provide the selected advertisement to the search engine for display at a client device. However, the invention is not so limited, and PS 106 might provide the selected advertisement to the client device, itself.

Devices that may operate as ad server 107, content server 108, and/or PS 106 include, but are not limited to personal computers, desktop computers, multiprocessor systems, microprocessor-based or programmable consumer electronics, network PCs, servers, network appliances, and the like.

Although PS 106 is illustrated as a distinct network device, the invention is not so limited. For example, a plurality of network devices may be configured to perform the operational aspects of PS 106. However, in another embodiment, functionality of ad server 107, content server 108, and PS 106 might be performed using a single network device. Moreover, in another embodiment, ad server 107 might provide the advertisement and query/advertisement information to PS 106 for analysis, while PS 106 may also include a search query engine for use in obtaining a search query result that may be provided in conjunction with a selected advertisement. Thus, it should be recognized that while three distinct network devices are illustrated, the operations of such network devices may be combined and/or shared across virtually any arrangement. Thus, the invention is not limited to a particular arrangement of devices or distribution of functions, and other configurations are also envisaged. Therefore, system 100 should not be construed as limiting the invention.

Illustrative Client Environment

Figure 2:
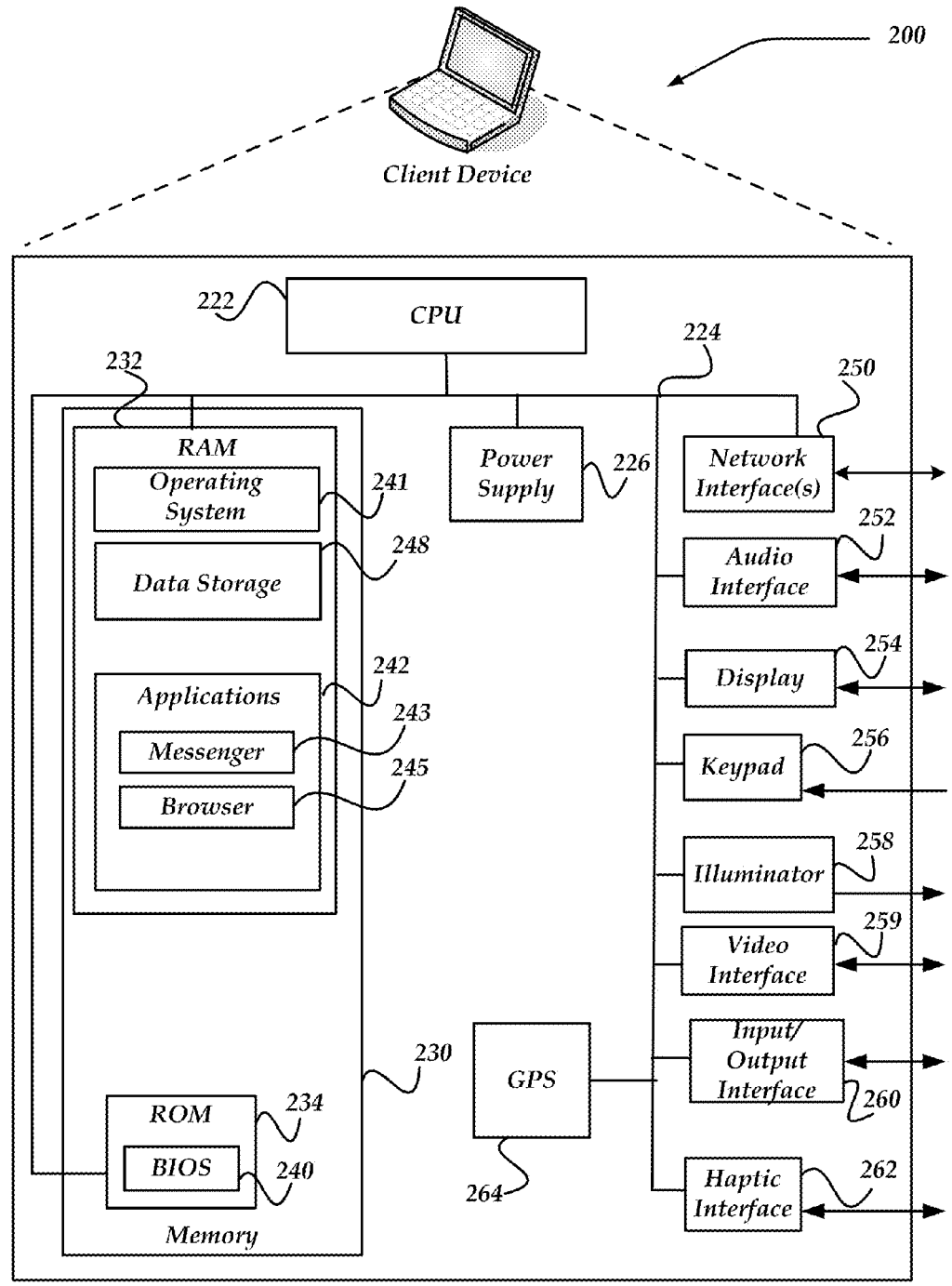
FIG. 2 shows one embodiment of a client device that may be included in a system implementing various embodiments.

FIG. 2 shows one embodiment of client device 200 that may be included in a system implementing the invention. Client device 200 may include many more or less components than those shown in FIG. 2. However, the components shown are sufficient to disclose an illustrative embodiment for practicing the present invention. Client device 200 may represent, for example, one of client devices 101-104 of FIG. 1.

As shown in the figure, client device 200 includes a processing unit (CPU) 222 in communication with a mass memory 230 via a bus 224. Client device 200 also includes a power supply 226, one or more network interfaces 250, an audio interface 252, video interface 259, a display 254, a keypad 256, an illuminator 258, an input/output interface 260, a haptic interface 262, and an optional global positioning systems (GPS) receiver 264. Power supply 226 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling client device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, Bluetooth™, infrared, Wi-Fi, Zigbee, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Video interface 259 is arranged to capture video images, such as a still photo, a video segment, an infrared video, or the like. For example, video interface 259 may be coupled to a digital video camera, a web-camera, or the like. Video interface 259 may comprise a lens, an image sensor, and other electronics. Image sensors may include a complementary metal-oxide-semiconductor (CMOS) integrated circuit, charge:coupled device (CCD), or any other integrated circuit for sensing light.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. In addition, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, Wi-Fi, Zigbee, or the like. Haptic interface 262 is arranged to provide tactile feedback to a user of the client device. For example, the haptic interface may be employed to vibrate client device 200 in a particular way when another user of a computing device is calling.

Optional GPS transceiver 264 can determine the physical coordinates of client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of client device 200 on the surface of the Earth. It is understood that under different conditions, GPS transceiver 264 can determine a physical location within millimeters for client device 200; and in other cases, the determined physical location may be less precise, such as within a meter or significantly greater distances. In one embodiment, however, a client device may through other components, provide other information that may be employed to determine a physical location of the device, including for example, a MAC address, IP address, or the like.

Mass memory 230 includes a RAM 232, a ROM 234, and other storage devices. Mass memory 230 illustrates another example of computer readable storage media as storage devices for storage of information such as computer readable instructions, data structures, program modules, or other data. Mass memory 230 stores a basic input/output system ("BIOS") 240 for controlling low-level operation of client device 200. The mass memory also stores an operating system 241 for controlling the operation of client device 200. It will be appreciated that this component may include a general-purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 230 further includes one or more data storage 248, which can be utilized by client device 200 to store, among other things, applications 242 and/or other data. For example, data storage 248 may also be employed to store information that describes various capabilities of client device 200, as well as store an identifier. In one embodiment, the identifier and/or other information about client device 200 might be provided automatically to another networked device, independent of a directed action to do so by a user of client device 200. Thus, in one embodiment, the identifier might be provided over the network transparent to the user.

Moreover, data storage 248 may also be employed to store personal information including but not limited to contact lists, personal preferences, data files, graphs, videos, or the like. At least a portion of the stored information may also be stored on a disk drive or other storage medium (not shown) within client device 200.

Applications 242 may include computer executable instructions which, when executed by client device 200 within a processor such as CPU 222, may perform actions, including, transmit, receive, and/or otherwise process messages (e.g., SMS, MMS, IM, email, and/or other messages), multimedia information, and enable telecommunication with another user of another client device, as well as perform other actions associated with one or more applications, operating system components, and the like. Other examples of application programs include calendars, browsers, toolbar applications, email clients, IM applications, SMS applications, VOIP applications, contact managers, task managers, transcoders, database programs, word processing programs, security applications, spreadsheet programs, games, search programs, and so forth. Applications 242 may include, for example, messenger 243, and browser 245.

Browser 245 may include virtually any client application configured to receive and display graphics, text, multimedia, and the like, employing virtually any web based language. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message. However, any of a variety of other web-based languages may also be employed. Moreover, browser 245 may be employed to request various content and/or receive such content, along with one or more advertisements. In one embodiment, browser 245 might also be employed to perform one or more search query requests over a network, such as the Internet, or the like, and to request along with search results, one or more advertisements in response. In one embodiment, at least one advertisement might have been selected for inclusion based on mechanisms such as those described further below.

Messenger 243 may be configured to initiate and manage a messaging session using any of a variety of messaging communications including, but not limited to email, Short Message Service (SMS), Instant Message (IM), Multimedia Message Service (MMS), internet relay chat (IRC), mIRC, and the like. For example, in one embodiment, messenger 243 may be configured as an IM application, such as AOL Instant Messenger, Yahoo! Messenger, .NET Messenger Server, ICQ, or the like. In one embodiment messenger 243 may be configured to include a mail user agent (MUA) such as Elm, Pine, MH, Outlook, Eudora, Mac Mail, Mozilla Thunderbird, gmail, or the like. In another embodiment, messenger 243 may be a client application that is configured to integrate and employ a variety of messaging protocols. In one embodiment, a message may also be received that includes one or more advertisements that are selected based on similar mechanisms as those described further below. For example, a content of a message may be used as a substitute to a search query. That is, an analysis of a message thread (e.g., series of multiple related messages), content of one or related messages, or the like, might be used to generate a phrase or unigram (one or more words), that may be used as though a search query was submitted. Then, rather than providing a search query result, an advertisement might be selected for insertion into one of the messages based on a process substantially similar to process 400 of FIG. 4.

Illustrative Network Device Environment

Figure 3:
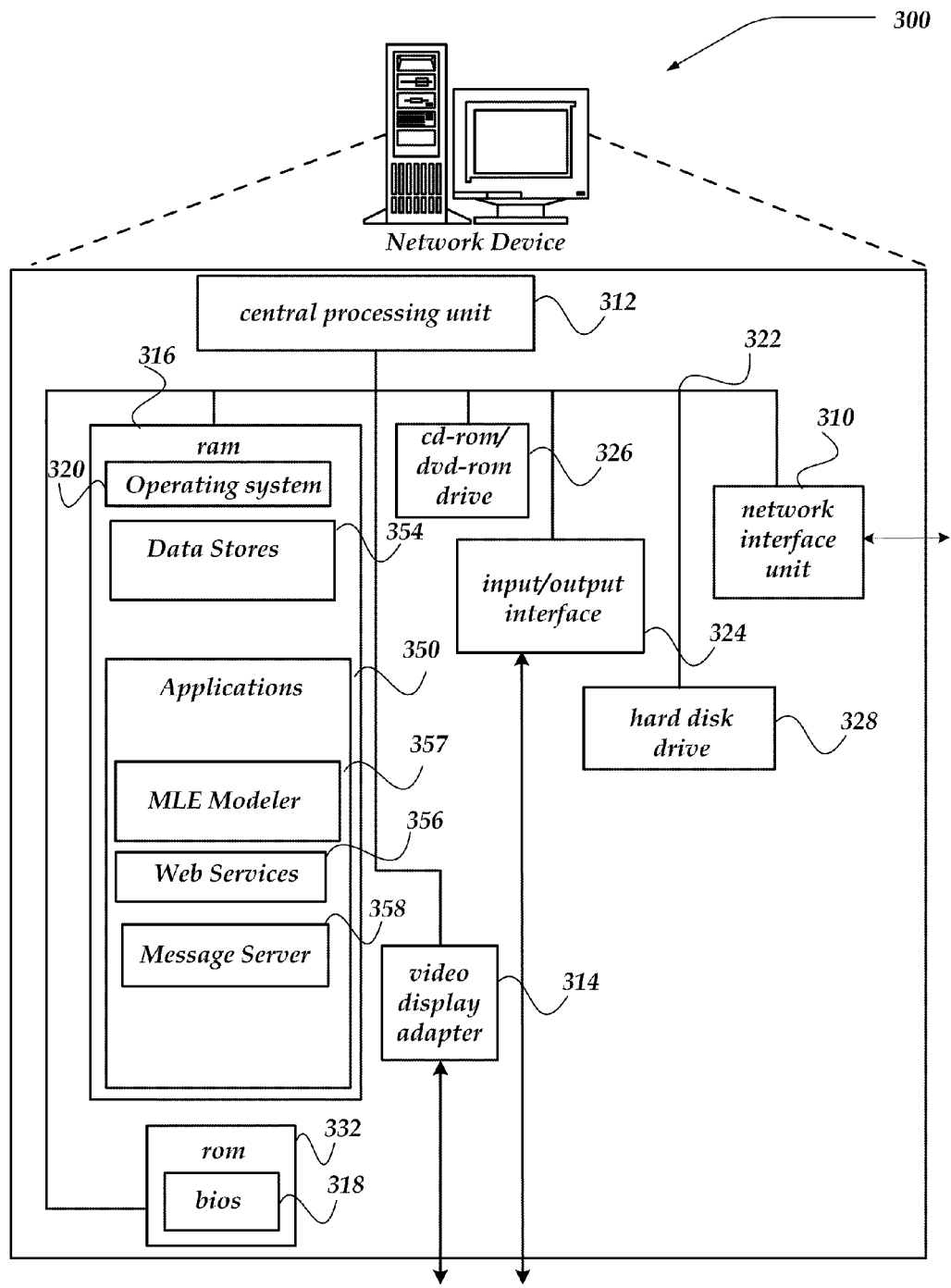
FIG. 3 shows one embodiment of a network device that may be included in a system implementing various embodiments.

FIG. 3 shows one embodiment of a network device, according to one embodiment of the invention. Network device 300 may include many more components than those shown. The components shown, however, are sufficient to disclose an illustrative embodiment for practicing the invention. Network device 300 may represent, for example, a combination of PS 106 and/or content server 107 of FIG. 1.

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable media, namely computer storage media. Such computer-readable media are physical devices. Computer-readable storage media may include volatile, non-volatile, removable, and non-removable media implemented in any method or technology for storage of information, such as computer readable instructions, data structures, program modules, or other data. Examples of computer readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other physical medium which can be used to store the desired information and which can be accessed by a computing device.

The mass memory also stores program code and data. For example, mass memory might include data stores 354. Data stores 354 may be include virtually any mechanism usable for store and managing data, including but not limited to a file, a folder, a document, or an application, such as a database, spreadsheet, or the like. Data stores 354 may manage information that might include, but is not limited to web pages, account information, or the like, as well as scripts, applications, applets, and the like. Data stores 354 may also include advertisements; advertisement information including but not limited to query-advertisement CTR data, advertisement CTR data, or the like. At least some of the data and other information stored within data stores 354 may be stored in part or in whole on other computer readable storage media including, hard disk drive 328, cd-rom/dvd-rom drive 326, or even on another remote network device.

One or more applications 350 may be loaded into mass memory for execution by central processing unit 312 to perform various actions. Such applications 350 may include, but are not limited to HTTP programs, customizable user interface programs, IPSec applications, encryption programs, security programs, VPN programs, web servers, account management, and so forth. Applications 350 may include web services 356, Message Server (MS) 358, and Maximum Likelihood Estimator (MLE) Modeler 357.

Web services 356 represent any of a variety of services that are configured to provide content, including messages, over a network to another computing device. Thus, web services 356 include for example, a web server, messaging server, a File Transfer Protocol (FTP) server, a database server, a content server, or the like. Web services 356 may provide the content including messages over the network using any of a variety of formats, including, but not limited to WAP, HDML, WML, SMGL, HTML, XML, cHTML, xHTML, or the like.

Web services 356 may further include a search query engine that is configured to receive a search query request, perform a search based on the search query over a plurality of different data sources, and to provide a response to the request. In one embodiment, Web services 356 provide information about the search query request to MLE modeler 357. Web services 356 may further receive one or more advertisements from MLE modeler 357 for use in displaying to a client device alongside or otherwise in conjunction with a search query result. In one embodiment, Web services 357 might receive information, such as link, or the like, usable to access the one or more advertisements from other than MLE modeler 357. For example, MLE modeler 357 might provide a link to an advertisement residing on another network device, such as Ad server 107 of FIG. 1, or the like.

Web services 356 may further include a component that is configured to monitor various click-through selections of displayed advertisements, as well as click-through rate data for various query-advertisement combinations. Web services 356's component may further provide such CTR data to various network devices, computer-readable storage devices, or the like, for later use in subsequent selections of which advertisements might be displayed for a given search query.

Message server 358 may include virtually any computing component or components configured and arranged to forward messages from message user agents, and/or other message servers, or to deliver messages to a local message store, such as data stores 354, or the like. Thus, message server 358 may include a message transfer manager to communicate a message employing any of a variety of email protocols, including, but not limited to, Simple Mail Transfer Protocol (SMTP), Post Office Protocol (POP), Internet Message Access Protocol (IMAP), NNTP, or the like. In one embodiment, information from one or more messages might be provided to MLE modeler 357 for use in selecting an advertisement for insertion into at least one message.

It should be noted, however, that message server 358 is not constrained to email messages, and other messaging protocols may be managed by one or more components of message server 358. Thus, message server 358 may also be configured to manage SMS messages, IM, MMS, IRC, mIRC, or any of a variety of other message types.

MLE modeler 357 is configured to employ a maximum likelihood estimation (MLE) under a covariance matrix floor constraint to predict missing data from observed data. In one embodiment, MLE modeler 357 may make predictions of missing CTR data based on observed CTR data. MLE modeler 357 may then use the select an advertisement based on the predicted and observed CTR data. That is, in one embodiment, MLE modeler 357 may receive a plurality of observed click-through click-through rate data associated with a plurality of related advertisements, and/or query-advertisement combinations. MLE modeler 357 may further receive a related new advertisement for placement, where the new advertisement is determined to be absent of observed click-through rate data.

MLE modeler 357 may then use the plurality of observed click-through rate data associated with the plurality of related advertisements to estimate statistical parameters about the plurality of related advertisements, where the estimation of the statistical parameters is subject to a covariance constraint such that a lower bound for each covariance is a given symmetric, positive-definite matrix. MLE modeler 357 may use the estimated statistical parameters, to predict statistical parameters for the related new advertisement. MLE modeler 357 may then employ the estimated and predicted statistical parameters to select an advertisement from the plurality of related advertisements and the new advertisement for display at a client device, in response to a received search query. MLE modeler 357 may employ a process such as is described in more detail below in conjunction with FIG. 4.

Briefly, a maximum likelihood solution may be derived for approximately Gaussian distributions under the constraint that the covariance matrix be greater than or equal to a positive-definite matrix. An extension for a mixture of Gaussians is next disclosed below using, in one embodiment, an expectation-maximization algorithm for determining maximum likelihood estimates of various statistical parameters, including, for example, estimated means.

As an introduction, given a sample $X=\{x_1, \ldots, x_n\}$, $x_i \in R^p$, from a Gaussian distribution $N(x;\mu,\Sigma)$, the maximum likelihood mean vector $\mu$ and, if it exists, covariance matrix $\Sigma$ are given by the same mean and covariance matrix, respectively as:

$$m = n^{-1} \sum_{i=1}^{n} x_i, \; S = n^{-1} \sum_{i=1}^{n} (x_i - m)(x_i - m)^T \quad (1)$$

The maximum likelihood $\Sigma$ does not exist if S is singular, e.g., when $p \geq n$. Therefore, as disclosed, the maximum likelihood solution is derived under the constraint that $\Sigma$ is lower bounded by a symmetric, positive-definite matrix $\Psi$, such that $\Sigma \geq \Psi$. That is, $\Sigma - \Psi$ is nonnegative definite. This lower-bound constraint implies then that the variances be greater than or equal to some threshold value. If both $\Sigma$ and $\Psi$ are diagonal, then the constraint $\Sigma \geq \Psi$ reduces to $\rho_{ii} \geq \Psi_{ii}$ and the maximum likelihood solution reduces to $\Sigma^*_{ii} = \max(\Psi_{ii}, S_{ii})$ for all i. As described further below, a general solution is disclosed when $\Sigma$ and $\Psi$ are arbitrary positive-definite matrices, and X is assumed to be complete. Further disclosed is an incomplete data case.

In the complete case, the maximum likelihood $\mu$ and $\Sigma$ are found by solving the constrained optimization problem:

$$\max_{\mu, \Sigma} L(\mu, \Sigma; X) \text{ s.t. } \Sigma \geq \Psi > 0$$

where $\Psi > 0$ denotes that $\Psi$ is positive definite, and L is the log-likelihood function, $$L(\mu, \Sigma; X) \equiv -\frac{n}{2}\log((2\pi)^d|\Sigma|) - \frac{1}{2}tr\left(\Sigma^{-1}\sum_{i=1}^{n}(x_i - \mu)(x_i - \mu)^T\right) \quad (2)$$

The function L is separately concave in $\mu$ and $\Sigma^{-1}$ but not jointly. Taking derivatives with respect to $\mu$ and setting them to zero, the maximum likelihood $\mu$ is found to be the same mean $\mu^* = m-$ the same as the estimate in the unconstrained case in Equation 1, above. Plugging that value into Equation 2 provides a new problem over $\Sigma^{-1}$ of:

$$\max_{\Sigma^{-1}} \log|\Sigma^{-1}| - tr(\Sigma^{-1}S) \text{ s.t. } 0 < \Sigma^{-1} \leq \Psi^{-1} \quad (3)$$

where the objective function is rescaled and constants, are removed. The constraint on $\Sigma^{-1}$ follows from $\Sigma \geq \Psi$ if and only if $\Sigma^{-1} \leq \Psi^{-1}$.

Equation 3 has a unique global maximum which is attained. This property follows because the objective function is strictly concave in $\Sigma^{-1}$, and the relaxed constraint set $0 \leq \Sigma^{-1} \leq \Psi^{-1}$ is compact, and the maximum of the relaxed problem occurs at $\Sigma^{-1} > 0$, therefore coinciding with the maximum of the original problem in equation 3.

Using the transformation $K \equiv \Psi^{T/2}\Sigma^{-1}\Psi^{1/2}$ (where $\Psi^{1/2}$ is a square root of $\Psi$. That is, $\Psi = \Psi^{1/2}\Psi^{T/2}$) original problem may be converted into a nested sequence of problems in terms of the eigenpairs of K. In terms of K, the problem then becomes:

$$\max_{K} \log|K| - tr(KQ), 0 < K \leq I$$

where $Q \equiv \Psi^{-1/2}S\Psi^{-T/2}$, and I is the identity matrix, and any constants are removed for convenience. The constraint on K then follows from $\Sigma^{-1} \geq \Psi^{-1}$ if and only if $\Psi^{1/2}\Sigma^{-1}\Psi^{T/2} \geq I$. Since K>0, it has an eigendecomposition $U\Lambda U^T$ with orthonormal U and positive-diagonal $\Lambda$. In terms of U and $\Lambda$, the problem then becomes:

$$\max_{\{\lambda_i, u_i\}_{i=1}^{p}} \sum_{i=1}^{p} (\log\lambda_i - (u_i^T Q u_i)\lambda_i) \text{ s.t. } \lambda_i \in (0, 1], u_i u_j^T = \delta_{ij} \quad (4)$$

where $(\lambda_i, u_i)$ denotes the i-th eigenpair, and $\delta_{ij}=1$ if i=j and 0 otherwise. The above may then be solved first for $\lambda_i$ on $u_i$, and then for $u_i$. Several observations may be made about the functions $f_u(\lambda) \equiv \log \lambda - u\lambda$ and $$g(u) \equiv \max_{\lambda \in (0,1]} f_u(\lambda),$$

$u \geq 0$, appearing in equation 4 above. First, $f_u(\lambda)$ is strictly concave in $\lambda$ with a global maximum at $\lambda^* = \max(1, u)^{-1}$ under the constraint that $\lambda \in (0, 1]$. Second, $g(u)$ is monotonically decreasing in u. Based on the first observation, $u_i$ cqn be set such that $u_i^T Q u_i$'s are as small as possible, which can be accomplished by setting $u_1$ to be the eigenvector corresponding to the next smallest eigenvalue, and so on. The $u_i$'s can be selected in a nested manner because the log-likelihood function decomposes into functions of eigenpairs.

The above solution may then be expressed in a closed form as follows. Denote the eigendecomposition of Q by $U_Q \Lambda_Q U_Q^T$ with orthonormal $U_Q$ and nonnegative diagonal $\Lambda_Q$ (some eigenvalues of Q are zero if $p \leq n$; the eigenvectors corresponding to the zero eigenvalues are arbitrarily chosen up to the constraint $U_Q U_Q^T = I$). Then the optimal solution is given as $U_{K^*} = U_Q$ and $\Lambda_{K^*} = \max(I, \Lambda_Q)^{-1}$ where max denotes an element-wise maximum. Inverting back the K-transformation, the maximum likelihood $\Sigma$ is found to be:

$$\Sigma^* = \Psi^{1/2} U_Q \max(I, \Lambda_Q) U_Q^T \Psi^{T/2} \quad (5)$$

However, real-world applications typically require a more flexible model than a single Gaussian. Therefore, for incomplete data sets, such as described above with respect to, for example, query-advertisement CTR data, the expectation-maximization algorithm may be employed to develop an extension of the above for mixture of Gaussian distributions of the form:

$$p(x) = \sum_{i=1}^{M} \alpha_i N(x; \mu_i, \Sigma_i) \quad (6)$$

where M is the number of components, and $\alpha_i$, $\mu_i$, and $\Sigma_i$ are the weight, mean, and covariance matrix associated with the i-th component. Then, an estimation of the parameters for this model may be determined subject to the covariance constraints $\Sigma_i \leq \Psi$. This constraint provides robustness against noise in the data, as well as enables for some dimensions of x to be missing.

Generalized Operation

The operation of certain aspects of the invention will now be described with respect to FIG. 4. The above approach may be employed to predict, for example, missing click-through rates in search query advertising. Employing the auto insurance example discussed above, then using the above disclosed approach extended for incomplete data sets, the observed CTRs (levels 1 and 3 above) may be used to predict the missing CTR data for levels 2, 4, and 5. The approach described below employs two stages. The first stage, which may be implemented as an offline stage, estimates the statistical parameters of the model in equation 6 above. The second, online stage, applies the model above to predict any missing CTR values (levels 2, 4, and 5) from the observed CTR values (from levels 1 and 3). It should be noted, that other arrangements and levels of CTR data may be employed. Thus, embodiments are not limited to these arrangements. For example, the missing data pattern need not be hierarchical. Moreover, while several values are missing in the example, more or less values may be missing.

Figure 4:
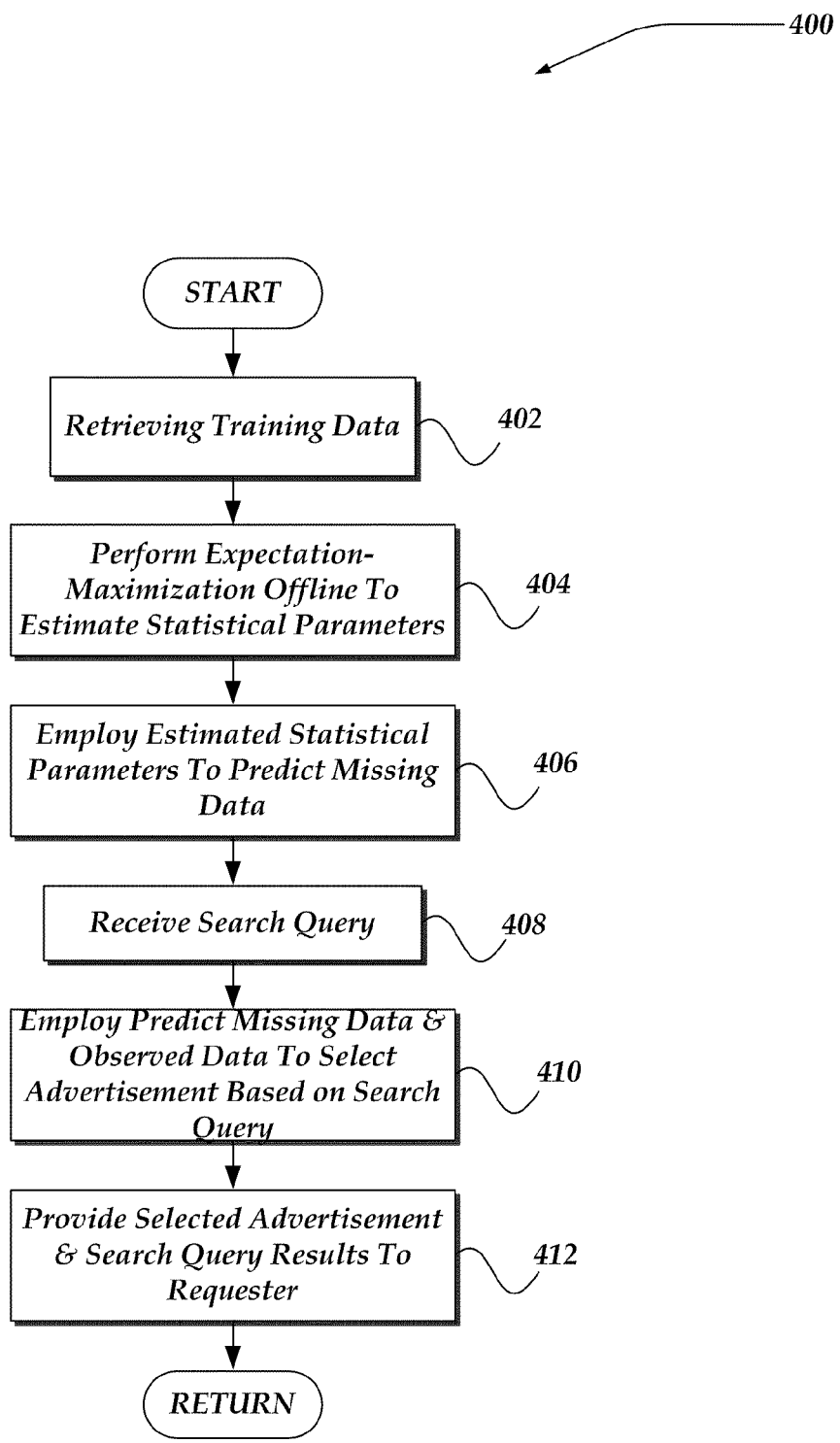
FIG. 4 illustrates a logical flow diagram generally showing one embodiment of an overview process for employing a maximum likelihood estimation under a covariance floor constraint to predict missing values in, for example, a query-ad hierarchy, for use in selecting an advertisement for display in response to a search query.

Thus, FIG. 4 illustrates a logical flow diagram generally showing one embodiment of an overview process for employing a maximum likelihood estimation under a covariance floor constraint to predict missing values in, for example, query-advertisement data, for use in selecting an advertisement for display in response to a search query. Process 400 of FIG. 4 may be implemented within PS 106 of FIG. 1, for example.

Process 400 is described using a query-advertisement example; however, as noted below and elsewhere, embodiments may be employed for other data sets. In any event, process 400 begins at block 402, where historical data sets are obtained for use as training data useable to estimate various statistical parameters of equation 6 above. In one embodiment, the estimation of the parameters, performed at block 404 below may be performed offline.

The training data set is $Y=\{y_1, \ldots, y_n\}$ where $y_i$ is the observed CTR vector from various historical search query logs. Further, the corresponding complete data set by be denoted as $X=\{x_1, \ldots, x_n\}$, and missing mixture indicators by $Z=\{z_1, \ldots, z_n\}$. Thus, a vector is generated that includes components representing observed CTR data and one or more components representing the missing CTR data (missing observed CTR data).

Proceeding to block 404, in one embodiment, an expectation-maximization algorithm may be used to estimate the parameters $\alpha_i, \mu_i,$ and $\Sigma_i$, for i=1, . . . , M. That is, the following may be iterated over:

Expectation Step:

$$\gamma_{it} = p(z_t = i | y_t)$$

Maximization Step:

$$\alpha_i = n^{-1} \sum_{t=1}^{n} \gamma_{it}$$

$$\mu_i = n^{-1} \sum_{t=1}^{n} \gamma_{it} E_{\theta}[x_t | y_t, z_t = i]$$

$$\Sigma_i = \Psi + \Psi^{1/2} \left( \sum_{k : \lambda_{Q_i}^k} (\lambda_{Q_i}^k - 1) u_{Q_i}^k (u_{Q_i}^k)^T \right) \Psi^{T/2}$$

In the steps above, i=1, . . . , M and t=1, . . . , n. Further:

$$Q_i \equiv \Psi^{-1/2} \left( n^{-1} \sum_{t=1}^{n} \gamma_{it} E_{\theta}[x_t x_t^T | y_t, z_t = i] - m_i m_i^T \right) \Psi^{-T/2}$$

and $(\lambda_{Q_i}^k, u_{Q_i}^k)$ is the k-th eigenpair of $Q_i$. In the Expectation step, $\theta$ refers to the current parameters, i.e., $\alpha_i, \mu_i,$ and $\Sigma_i$ from the previous iteration. The iteration may begin from a virtually any arbitrary, but valid initial point. In one embodiment, the covariance-matrix lower bounds may be selected to optimize the missing value performance on held-out or testing data set not used during the estimation procedure. It may also be desirable to increase the lower bound for data sets that are considered to be noisy due to sparse data, accidental clicks, and robots. However, such determinations for the lower bound may also be based on a plurality of engineering studies for a given data set.

In any event, the output of block 404 is the estimated statistical parameters $\alpha_i, \mu_i,$ and $\Sigma_i$, the component weights, means, and covariance matrices, respectively, again, under the constraint $\Sigma_i \geq \Psi$.

Proceeding to block 406, the estimated statistical parameters are employed to predict the missing data. In one embodiment, block 406 may be performed in an online stage. Let the observed dimensions be denoted by $x_o$ (for example, CTR at the levels 1 and 3 in the above non-limiting example), and the missing data be denoted by $x_m$ (CTR at levels 2, 4, and 5). Then the missing values may be estimated by:

$$\hat{x} = E[x_m | x_o] = \sum_{i=1}^{M} \gamma_i \mu_i^{m|o}$$

where $$\gamma_i = \frac{\alpha_i p(x_o | z = i)}{p(x_o)}$$

and:

$$\mu_i^{m|o} = \mu_i^m + \Sigma_i^{mo}(\Sigma_i^{oo})^{-1}(x_o - \mu_i^o)$$

$$p(x_o | z = i) = N(x_o; \mu_i, \Sigma_i^{oo})$$

and further:

$$p(x_o) = \sum_{i=1}^{M} \alpha_i p(x_o | z = i)$$

The quantities $\mu_i^m, \mu_i^o, \Sigma_i^{mo},$ and $\Sigma_i^{oo}$ are obtained by taking the subsets of $\mu_i$, and $\Sigma_i$, commensurate with the missing and observed dimensions $x_m$ and $x_o$.

Processing flows next to block 408, where a search query is received. In one embodiment, the search query might be received prior to block 402, such that the training data may be selected based, in part, on the search query. In any event, processing flows next to block 410, where the predicted missing data and the observed data from block 406 is employed to select an advertisement for the given search query. While the advertisement may be selected based on a variety of criteria, in one embodiment, the advertisement may be selected based, at least in part, on a CTR value for a given query-advertisement combination exceeding a defined threshold, or similar criteria. For example, in one embodiment, the query-advertisement combination having a highest CTR value may be selected. Thus, the predicted missing CTR values and the observed CTR values for the various query-advertisement combinations may be evaluated to select an advertisement for the search query.

Flowing next to block 412, the selected advertisement may be provided to a requester. In one embodiment, the selected advertisement may be provided for display along with a search query results. Process 400 may then return to a calling process to perform other actions.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems that perform the specified actions or steps, or combinations of special purpose hardware and computer instructions.

Alternate Applications

As discussed above, the approach described above for predicting missing data given observed data using a maximum likelihood approach under the constraint that the covariance matrix be greater than or equal to a positive-definite matrix may be used for other applications beyond CTR data. For example, automatic speech recognition systems often employ mixtures of Gaussian distributions for modeling various spectral features coming from different phonetic units. The covariance matrices in such models may then be constrained to be greater than some threshold, such as a percentage of a sample covariance matrix, or the like. In this manner, the models will have robustness against noise in the training data, and be prevented from overfitting. The resulting models may provide a non-trivial mass when applied to, for example, new speakers, microphones, and/or other acoustic conditions where data may be missing. This approach may then provide an advantage over traditional approaches that might handle such constraints in an ad-hoc manner.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A network device, comprising:
   a transceiver to send and receive data over the network; and
   a processor that is operative to perform actions, including:
      receiving a plurality of observed click-through rate data associated with a plurality of related advertisements;
      receiving a related new advertisement for placement, the related new advertisement missing observed click-through rate data;
      estimating statistical parameters about the plurality of related advertisements using the plurality of observed click-through rate data associated with the plurality of related advertisements, wherein the estimation of the statistical parameters is subject to a covariance constraint such that a lower bound for each covariance is a symmetric, positive-definite matrix;
      using the estimated statistical parameters, predicting a statistical parameter for the missing click-through rate data for the related new advertisement;
      receiving a search query; and
      employing the estimated and predicted statistical parameters to select an advertisement from the plurality of related advertisements and the related new advertisement; and
      providing a response to the search query with the selected advertisement.

2. The network device of claim 1, wherein the click-through rate data of related advertisements is extracted by category in a hierarchical manner.

3. The network device of claim 1, wherein the observed click-through data represents mixed Gaussian data.

4. The network device of claim 1, wherein an expectation-maximization algorithm is used to predict the statistical parameters.

5. The network device of claim 1, wherein estimating statistical parameters about the observed click-through rate data is performed using an iterative approach, and wherein if it is determined that a convergence is undetected within a determined time period, modifying the lower bound for the covariance constraint.

6. The network device of claim 1, wherein:
   estimating statistical parameters about the plurality of related advertisements is performed in an offline stage; and
   predicting a statistical parameter for the missing click-through rate data is performed during an online stage of operation.

7. The network device of claim 1, wherein predicting a statistical parameter for the missing click-through rate data further comprises predicting a mean value for the missing click-through rate data.

8. A computer-readable storage device having computer-executable instructions stored thereon, the computer-executable instructions when installed onto a computing device enable the computing device to perform actions, comprising:
   receiving a plurality of observed click-through rate data associated with a plurality of related advertisements;
   receiving a related new advertisement, the related new advertisement missing observed click-through rate data;
   generating a vector based on the plurality of observed click-through rate data, wherein the vector comprises components, including a component representing missing click-through rate data for the related new advertisement;
   estimating statistical parameters about at least the observed click-through rate data using the generated vector, wherein the estimation of the statistical parameters is subject to a covariance constraint such that a lower bound for each covariance is a symmetric, positive-definite matrix;
   using the estimated statistical parameters, predicting a statistical parameter for the missing click-through rate data for the related new advertisement;
   receiving a search query; and
   employing the estimated and predicted statistical parameters to select an advertisement from the plurality of related advertisements and the new advertisement; and
   providing a response to the search query with the selected advertisement.

9. The computer-readable storage medium of claim 8, wherein estimating statistical parameters further comprises employing an expectation-maximization algorithm to estimate at least one of a mean or covariance matrix for the observed click-through rate data.

10. The computer-readable storage medium of claim 8, wherein the vector comprises components representing the associated plurality of related advertisements and the related new advertisement in a hierarchical arrangement.

11. The computer-readable storage medium of claim 8, wherein the predicted statistical parameter comprises a mean value for the missing click-through rate data for the related new advertisement.

12. The computer-readable storage medium of claim 8, wherein the vector represents a mixture of Gaussian distributions.

13. The computer-readable storage medium of claim 8, wherein employing the estimated and predicted statistical parameters further comprises selecting an advertisement having a highest mean value for click-through rate among the plurality of related advertisements and the related new advertisement.

14. The computer-readable storage medium of claim 8, wherein estimating statistical parameters about at least the observed click-through rate data using the generated vector is performed using an iterative approach, and wherein if it is determined that a convergence is undetected within a determined time period, modifying the lower bound for the covariance constraint.

* * * * *